(12) United States Patent

Seifert et al.

(10) Patent No.: US 6,851,296 B2
(45) Date of Patent: Feb. 8, 2005

(54) MEASURING DEVICE AND METHOD FOR MEASURING A SEAT MAT FOR A VEHICLE SEAT

(75) Inventors: Dieter Seifert, Bechhofen (DE); Rene Wolf, Schwieberdingen (DE); Hermann Maier, Markgroeningen (DE); Ralf Henne, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,824

(22) PCT Filed: Jun. 23, 2001

(86) PCT No.: PCT/DE01/02321

§ 371 (c)(1),
(2), (4) Date: Jul. 31, 2002

(87) PCT Pub. No.: WO02/14808

PCT Pub. Date: Feb. 21, 2002

(65) Prior Publication Data

US 2003/0037617 A1 Feb. 27, 2003

(30) Foreign Application Priority Data

Aug. 16, 2000 (DE) .......................... 100 39 774

(51) Int. Cl.$^7$ .............................. G01G 19/56
(52) U.S. Cl. ......................................... 73/1.13
(58) Field of Search ................. 73/1.08, 1.13, 73/1.56, 1.57, 1.58, 1.59; 180/273; 280/735

(56) References Cited

U.S. PATENT DOCUMENTS 6,045,155 A * 4/2000 Cech et al. ................. 280/735
6,476,514 B1 * 11/2002 Schondorf ................. 307/10.1

FOREIGN PATENT DOCUMENTS

| DE | 44 03 073 | 8/1994 |
| WO | WO 99 39168 | 8/1999 |
| WO | WO 00 00370 | 1/2000 |

* cited by examiner

Primary Examiner—Robert Raevis
(74) Attorney, Agent, or Firm—Kenyon & Kenyon

(57) ABSTRACT

A measurement apparatus and a method for measuring a seat mat for a vehicle seat which serve to perform a function test or a recording of readings by way of a negative pressure that is generated in the seat mat. The negative pressure is established by way of a pressure difference between the negative pressure and the external atmospheric pressure. The method is thus independent of the external atmospheric pressure. The controller that establishes the pressure difference is embodied either electronically or mechanically.

7 Claims, 2 Drawing Sheets

MEASURING DEVICE AND METHOD FOR MEASURING A SEAT MAT FOR A VEHICLE SEAT

FIELD OF THE INVENTION

The present invention is based on a measurement apparatus and a method for measuring a seat mat for a vehicle seat.

BACKGROUND INFORMATION

It is already known that seat mats for a vehicle seat are measured, in terms of their function and in order to record readings, either with a plunger having a defined weight or in an overpressure chamber. The plunger has a specific weight, for example 400 g, while in the case of the overpressure chamber, a variety of readings can be generated by modifying the overpressure in a pressure chamber. The pressure chamber is approximately the same size as the seat mat, and is suitable for resisting a defined overpressure.

SUMMARY OF THE INVENTION

The measurement apparatus and method according to the present invention for measuring a seat mat for a vehicle seat have, in contrast, the advantage that because a negative pressure is used in the seat mat, an easily adjustable pressure difference between the external atmospheric pressure and the aforesaid negative pressure results in an accurate setting for the weight load. In particular, the method and measurement apparatus according to the present invention are thus independent of the external atmospheric pressure, since in fact only the difference is used to set the negative pressure.

The fact that a negative pressure is used in the seat mat makes the method according to the present invention safer, since there is no need for an overpressure chamber that can burst as a result of an uncontrolled overpressure. Since a pressure chamber is not necessary, the measurement apparatus according to the present invention can advantageously be placed along with the seat mat in an environmental chamber, in order to perform a temperature-dependent measurement. Because of the fact that an overpressure chamber is not required for the seat mat, the measurement apparatus is easily transportable and thus easy to handle.

It is particularly advantageous that the controller is embodied electronically, thus making automation possible. A mechanical embodiment of the controller results in flexible handling of the method according to the present invention.

DETAILED DESCRIPTION

Seat mats for vehicle seats have pressure-dependent resistors, for example in order to indicate to a restraint system in a vehicle who or what is sitting on the respective seat. This makes possible, in particular, a classification of persons (height and weight) and a differentiation between persons and objects. Seat profiles, in particular, are also used for this purpose.

The pressure-dependent resistors are so-called FSR (force sensing resistor) sensors. The FSR sensors are made up of two substrates onto which pressure-sensitive films and electrodes are applied. When a force is exerted on this FSR sensor, its electrical resistance decreases. This decrease is a monotonic function of the applied force. Several sensors, whose resistance values are measured and converted into digital values, are housed in a seat mat.

After the mats are manufactured, a functional test or instrumental characterization of the sensors in the seat mat is preformed. A method and measurement apparatus for measuring the seat mat for a vehicle seat which use a negative pressure in the seat are therefore utilized according to the present invention, a pressure difference being established between that negative pressure and the atmospheric pressure of the environment. This pressure difference is controlled by a controller that is embodied either electronically or mechanically. The readings are indicated as a function of the applied pressure produced by the negative pressure.

Figure 1:
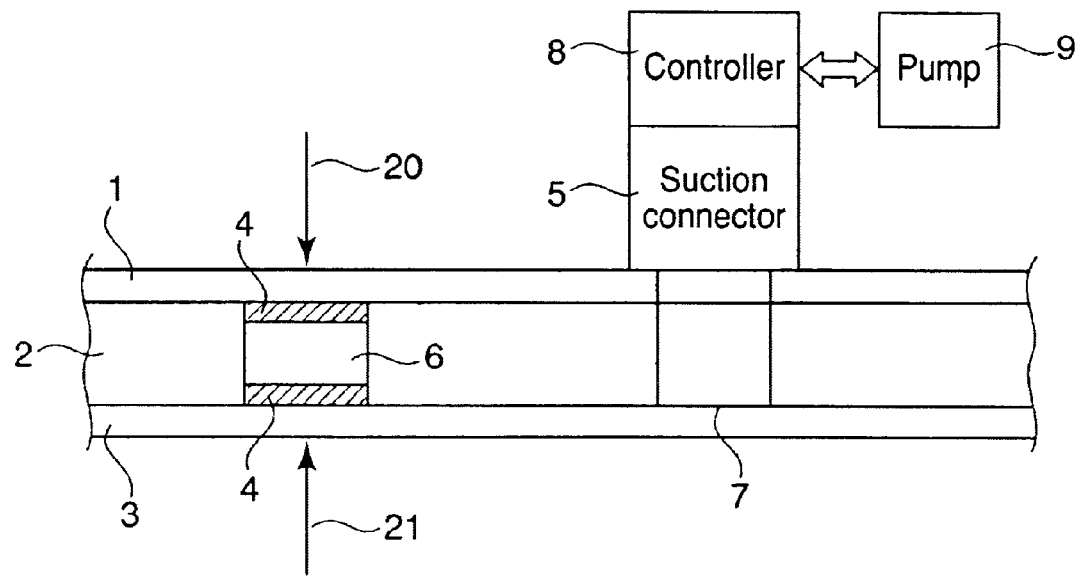
FIG. 1 is a schematic depiction of the seat mat in cross section, with the measurement apparatus connected.

FIG. 1 schematically depicts a cross section of a seat mat with a measurement apparatus according to the present invention connected to it. The seat mat has a film 1, a plastic layer 2 as spacer, and a second film 3, FSR sensors 4 being adhesively bonded onto films 1 and 3. In addition, electrodes and conductors (not depicted here) are applied onto films 1 and 3 in order to sense the readings of FSR sensors 4. Cavities 6 are present in the seat mat to allow an elastic reaction to an applied pressure. Since the air in cavities 6 is intended to escape when a weight is present on the vehicle seat having the seat mat, to allow an elastic reaction to that pressure the seat mat includes a venting conduit 7 to which the measurement apparatus according to the present invention is connected.

A suction connector 5 is therefore mounted on the seat mat via venting conduit 7. Connected to suction connector 5 at the other end is a pump 9 that, by way of a controller 8, controls in terms of the pressure difference between the negative pressure in the seat mat and the external atmospheric pressure. Controller 8 measures the vacuum and the external atmospheric pressure, and controls the pump in accordance with a value set on controller 8. Controller 8 is here arranged between suction connector 5 and pump 9. Arrows 20 and 21 indicate the force of the external atmospheric pressure that acts when a negative pressure is generated in the seat mat. The recording apparatus for the readings of FSR sensors 4, and the memory and output apparatus connected to the recording apparatus, are not depicted here.

The measured readings are converted into weight values using a stored table that is then located in a control unit in the vehicle. From those values, a processor in the control unit can then calculate how heavy and tall the person will be, the seat profile additionally being used. This is performed for adjustment of an airbag in order to prevent injury to persons upon triggering of an airbag.

Figure 2:
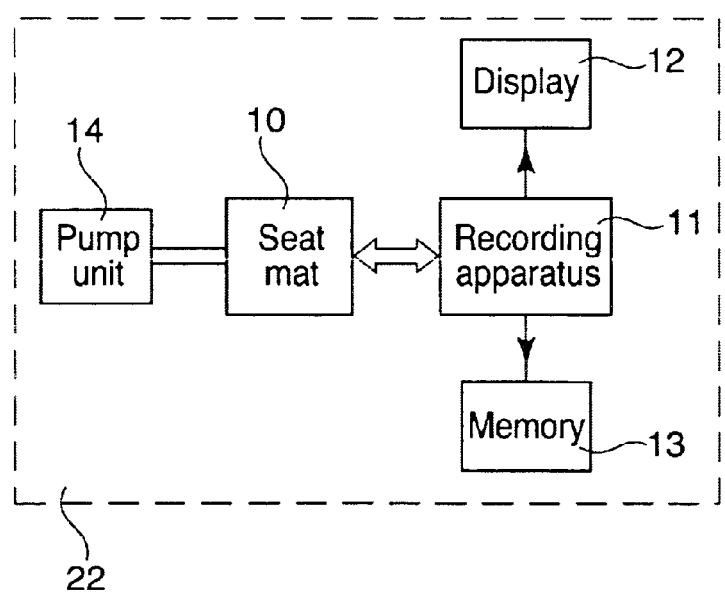
FIG. 2 is a block diagram of the seat mat and the connected measurement apparatus with analysis system.

FIG. 2 shows the seat mat with the connected measurement apparatus as a block diagram. A seat mat 10 is pumped down by way of the pump together with a controller and a suction connector, combined into block 14, in order thereby to generate a negative pressure in seat mat 10.

Electrical terminals of seat mat 10 lead to a recording apparatus 11 for the readings. A first data output of recording apparatus 11 for the readings leads to a display 12, and a second data output of recording apparatus 11 leads to a memory 13.

The regulated pump unit 14 pumps seat mat 10 down in order to generate the negative pressure, the negative pressure being established by a pressure difference between the negative pressure and the external atmospheric pressure. As a function of this pressure difference, FSR sensors 4 in seat mat 10 yield different resistance values that are measured by recording apparatus 11. For that purpose, recording apparatus 11 applies a voltage to the electrical terminal of electrical seat mat 10, or it drives a current through the electrical terminal, in order ultimately to ascertain the resistance of seat mat 10. These resistance values are then digitized and optionally further processed in recording apparatus 11 in order then to display the values by display 12 and/or store them in memory 13.

It is furthermore possible for a curve tracer to be connected to recording apparatus 11 so that the measured resistance values of FSR sensors 4 can be outputted directly as a function of the pressure difference that is generated. This furnishes a test of the functionality of seat mat 10. The measurement apparatus according to the present invention is therefore made up of suction connector 5, pump 9, controller 8, recording apparatus 11, display 12, and memory 13.

If the characteristic curve is to be outputted as a function of the pressure difference, a connection between controller 8 and recording apparatus 11 is provided.

Figure 3:
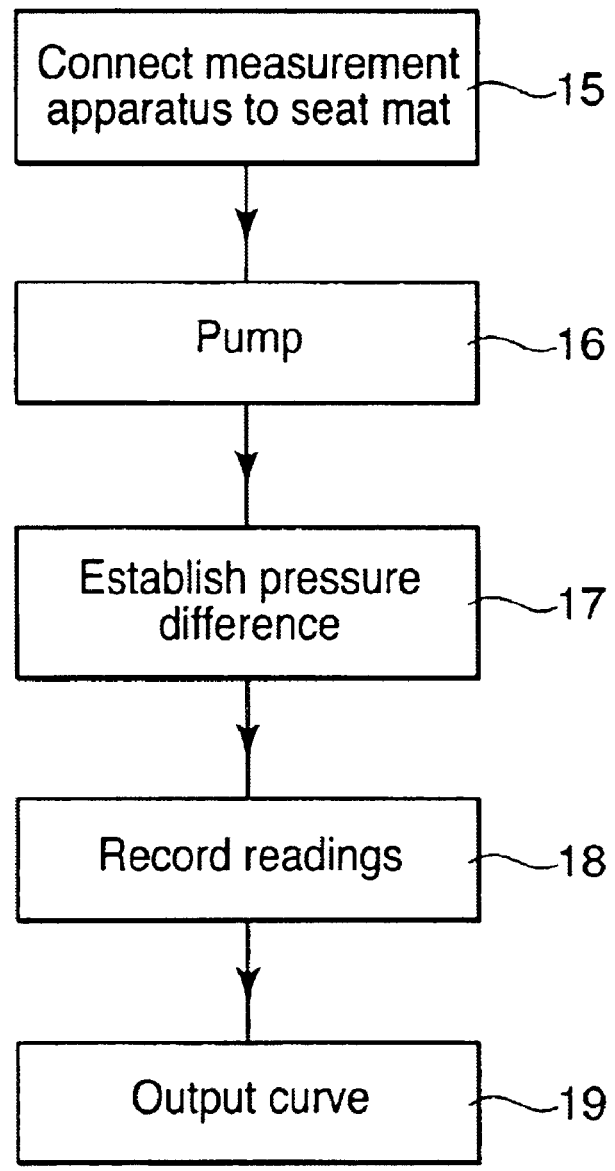
FIG. 3 shows the method according to the present invention as a flow chart.

FIG. 3 depicts, as a flow chart, the method according to the present invention for measuring seat mat 10 for a vehicle seat. In method step 15, the measurement apparatus according to the present invention is connected to seat mat 10. In method step 16, a pressure difference between the interior of seat mat 10 and the external atmospheric pressure is established by suction connector 5, pump 9, and controller 8, a negative pressure being generated in seat mat 10. For that purpose, the regulated pump unit 14 pumps the air conduits of seat mat 10 until empty.

In method step 17, this pressure difference is therefore established, and then in method step 18 the corresponding readings are recorded by recording apparatus 11 and optionally displayed with display 11 or stored in memory 13 for later processing. In method step 19, this output of the characteristic curve is performed.

It is furthermore possible for the measurement apparatus according to the present invention to be transported, with seat mat 10, into an environmental (climatic) chamber 22 (FIG. 2) so that a temperature-dependent measurement can be performed therein.

What is claimed is:

1. A measurement apparatus for measuring a seat mat of a vehicle seat, the seat mat including two films provided with pressure sensors between which at least one cavity is present, a plastic layer arranged between the two films, and a venting conduit, the measurement apparatus comprising:

a suction connector for connection to the venting conduit;

a pump for generating a negative pressure in the seat mat;

a controller for establishing a pressure difference between the negative pressure in the seat mat and an external air pressure;

a recording apparatus for reading the pressure sensors; and an arrangement for at least one of optically outputting a reading of the pressure sensors and storing the reading.

2. The measurement apparatus according to claim 1, wherein:

the controller includes an electronic controller.

3. The measurement apparatus according to claim 1, wherein:

the controller includes a mechanical controller.

4. A method for measuring a seat mat for a vehicle seat, comprising:

exposing the seat mat to a pressure load for at least one of: i) performing a recording of a reading, and ii) performing a function test;

establishing a negative pressure in the seat mat in order to generate a pressure load; and controlling a pressure difference in the seat mat between the negative pressure in the seat mat and an air pressure in an environment.

5. The method according to claim 4, wherein:

the measurement of the seat mat is performed in a climatic chamber.

6. The method according to claim 4, wherein:

the pressure difference is controlled electronically.

7. The method according to claim 4, wherein:

the pressure difference is controlled mechanically.

* * * * *

UNITED STATES PATENT AND TRADEMARK OFFICE
CERTIFICATE OF CORRECTION

PATENT NO. : 6,851,296 B2
DATED : February 8, 2005
INVENTOR(S) : Dieter Seifert et al.

It is certified that error appears in the above-identified patent and that said Letters Patent is hereby corrected as shown below:

Column 1,
Line 20, change "the scat mat" to -- the seat mat --

Signed and Sealed this

Seventh Day of June, 2005

JON W. DUDAS
*Director of the United States Patent and Trademark Office*